(12) United States Patent
Sun et al.

(10) Patent No.: US 8,765,305 B2
(45) Date of Patent: Jul. 1, 2014

(54) CATHODE ACTIVE MATERIAL FOR LITHIUM SECONDARY BATTERY, PROCESS FOR PREPARING THE SAME AND REACTOR FOR USE IN THE SAME PROCESS

(75) Inventors: Yang Kook Sun, Seoul (KR); Myoung Hun Lee, Seoul (KR); Yoon Jung Kang, Chungcheongnam-do (KR); Gil Ho Kim, Gyeongsangnam-do (KR)

(73) Assignee: Industry-University Cooperation Foundation, Hanyang University, Seoul (KR)

( * ) Notice: Subject to any disclaimer, the term of this patent is extended or adjusted under 35 U.S.C. 154(b) by 1415 days.

(21) Appl. No.: 10/580,890

(22) PCT Filed: Nov. 17, 2004

(86) PCT No.: PCT/KR2004/002980
§ 371 (c)(1),
(2), (4) Date: May 25, 2006

(87) PCT Pub. No.: WO2005/053064
PCT Pub. Date: Jun. 9, 2005

(65) Prior Publication Data
US 2007/0111098 A1  May 17, 2007

(30) Foreign Application Priority Data
Nov. 26, 2003 (KR) ........................ 10-2003-0084702

(51) Int. Cl.
*H01M 4/13* (2010.01)
*C01D 1/02* (2006.01)
*H01M 4/525* (2010.01)
*H01M 4/505* (2010.01)
*C01G 53/00* (2006.01)
*C01G 51/00* (2006.01)
*C01G 45/12* (2006.01)
*B01F 7/16* (2006.01)
*H01M 10/052* (2010.01)

(52) U.S. Cl.
CPC .............. *H01M 4/525* (2013.01); *H01M 4/505* (2013.01); *C01G 53/50* (2013.01); *C01G 51/50* (2013.01); *C01G 45/1228* (2013.01); *B01F 7/1685* (2013.01); *H01M 10/052* (2013.01)
USPC ... 429/231.95; 429/224; 429/223; 423/594.4; 423/306; 423/594.3; 423/594.5; 423/599

(58) Field of Classification Search
CPC ..... H01M 4/04; H01M 4/131; H01M 4/1315; H01M 4/362; H01M 4/364; H01M 4/505; H01M 4/525; H01M 4/523; H01M 10/052; B01J 19/006; B01J 19/18; B01F 7/1675; B01F 7/1685; C01G 45/12; C01G 51/04; C01G 51/05; C01G 51/06; C01G 53/05
USPC .......... 429/223, 224, 231.95; 423/306, 594.2, 423/599
See application file for complete search history.

(56) References Cited

U.S. PATENT DOCUMENTS

| | | | | |
|---|---|---|---|---|
| 4,594,228 | A | * | 6/1986 | Lambert et al. ............... 422/218 |
| 5,677,087 | A | | 10/1997 | Amine et al. ................. 429/224 |
| 5,788,943 | A | * | 8/1998 | Aladjov ................... 423/594.19 |
| 6,071,489 | A | * | 6/2000 | Sun et al. .................... 423/594.4 |
| 2002/0164527 | A1 | * | 11/2002 | Tanigawa et al. ............. 429/223 |
| 2003/0054251 | A1 | * | 3/2003 | Ohzuku et al. ............. 429/231.1 |
| 2003/0170540 | A1 | * | 9/2003 | Ohzuku et al. ............. 429/231.1 |

FOREIGN PATENT DOCUMENTS

| | | | | | |
|---|---|---|---|---|---|
| JP | 04123762 | | | 9/1990 | .............. H01M 4/58 |
| JP | 09129230 | A | * | 5/1997 | .............. H01M 4/58 |
| JP | 2001106534 | A | | 4/2001 | |
| JP | 2003197256 | | | 12/2001 | ............ H01M 10/40 |
| JP | 2002042813 | A | | 2/2002 | |
| JP | 2002100357 | A | | 4/2002 | |
| JP | 2002201028 | A | | 7/2002 | |
| JP | 2003257416 | A | * | 9/2003 | .............. H01M 4/02 |
| JP | 2005089225 | A | | 4/2005 | |
| JP | 2005149867 | A | | 6/2005 | |
| WO | WO03044881 | A1 | | 5/2003 | |
| WO | WO 03063275 | A1 | * | 7/2003 | .............. H01M 4/58 |
| WO | WO2004082046 | A1 | | 9/2004 | |

OTHER PUBLICATIONS

Vane, Collins English Dictionary, 2000, [online], [retrieved on Dec. 10, 2009], Retrieved from Credoreference using Internet <URL: http://www.credoreference.com/entry/hcengdict/vane>.*

Baffle, Chambers 21st Century Dictionary, 2001, [online], [retrieved on Dec. 10, 2009], Retrieved from Credoreference using Internet <URL: http://www.credoreference.com/entry/chambdict/baffle>.*

Machine translation for Moriuchi et al., JP 2003-257416 A.*

International Search Report—Mar. 16, 2005.

* cited by examiner

*Primary Examiner* — Edu E Enin-Okut (74) *Attorney, Agent, or Firm* — Lucas & Mercanti, LLP (57) ABSTRACT

The present invention relates to a cathode active material for a lithium secondary battery and a process for preparing the same. In accordance with the present invention, the cathode active material having a high packing density was designed and synthesized and thus provided is a cathode active material for a lithium secondary battery exhibiting structural stability such as improved characteristics for charge/discharge, service life and high-rate and thermal stability, by modifying surface of the electrode active material with amphoteric or basic compounds capable of neutralizing acid produced around the cathode active material.

2 Claims, 10 Drawing Sheets

(a) Example 1

(b) Comparative Example 2

Fig. 3

(a) Example 1

(b) Example 2

(c) Example 3

Fig. 4

(a) Per Mass (b) Per Volume

CATHODE ACTIVE MATERIAL FOR LITHIUM SECONDARY BATTERY, PROCESS FOR PREPARING THE SAME AND REACTOR FOR USE IN THE SAME PROCESS

RELATED APPLICATIONS

The present application is a national phase application of PCT/KR2004/002980, which in turn claims the benefit of priority from Korean Patent Application No, 10-2003-0084702, filed on Nov. 26, 2003, the entirety of which are incorporated herein by reference.

TECHNICAL FIELD

The present invention relates to a cathode active material for a lithium secondary battery, a process for preparing the same and a reactor for use in the same process.

BACKGROUND ART

A lithium ion secondary battery is a small, lightweight battery with a large capacity and has been widely used as a power source for portable instruments since its advent in 1991. Recently, as a result of rapid developments in the electronic, communication and computer industries, a camcorder, a mobile phone and a notebook computer have been remarkably developed. Therefore, as a power source for driving these info-communication instruments, a lithium ion secondary battery is in greater demand. In particular, a lot of recent studies on a power source for electric vehicles by hybridization of an internal combustion engine and the lithium secondary battery are actively undertaking in many countries including USA, Japan and Europe. The current commercially available small-sized lithium ion secondary battery uses $LiCoO_2$ as a cathode and carbon as an anode, respectively. As a cathode material that is actively being studied and developed, mention may be made of $LiNiO_2$, $LiNi_{1-x}Co_xO_2$ and $LiMn_2O_4$. $LiCoO_2$ is an excellent material having stable charge/discharge characteristics, superior electron conductivity, high thermal stability and flat discharge voltage characteristics, but Co is in shortage of ore reserve, expensive and, further, toxic to humans, and therefore, there remains a need for developing alternative electrode active materials. Since $LiMn_2O_4$ having a spinel structure has a theoretical capacity of about 148 mAh/g, which is small when compared to other materials, and a three-dimension al(3-D) tunnel structure, it exhibits a large diffusion resistance upon insertion/release of lithium ions, thereby has a relatively low diffusion coefficient, as compared to $LiCoO_2$ and $LiNiO_2$, having a two-dimensional(2-D) structure, and has poor cyclability to a Jahn-Teller effect. Particularly, it exhibits poor characteristics at temperatures of more than 55° C., compared to $LiCoO_2$ and thereby is not widely used in practical battery applications at present. Therefore, a great deal of studies on materials having a layered crystal structure have been undertaken as a material capable of overcoming the problems as mentioned above. $LiNiO_2$ having a layered structure like $LiCoO_2$ shows large discharge capacity, but has disadvantages such as difficulty of material synthesis, rapid reduction of capacity due to changes in a crystal structure accompanied by charge/discharge cycles and a problem associated with thermal stability, thereby failing to be commercialized.

As an attempt to stabilize the crystal structure of $LiNiO_2$, there is known a technique realizing improved charge/discharge characteristics and thermal stability by replacing portions of Ni sites with Co, Al, Ti or Mn. In this regard, a number of techniques are known which relate to the preparation of a Li—Ni—Mn based composite oxide in which portions of Ni sites were replaced with Mn, or a Li—Ni—Mn—Co based composite oxide in which portions of Ni sites were replaced with Mn and Co. For example, U.S. Pat. No. 5,264,201 discloses a solid phase method involving mixing hydroxides or oxides of Ni and Mn with an excess amount of lithium hydroxide, or a synthetic method involving slurrifying oxides of Ni and Mn in an aqueous saturated lithium hydroxide solution, drying the slurry thus obtained in vacuo under a reduced pressure and calcining to obtain a material of formula $Li_xNi_{2-x-y}Mn_yO_2$ wherein x is between 0.8 and 1.0, and y is equal to or less than 0.2. Further, U.S. Pat. No. 5,626,635 discloses a technique relating to a Li—Mn—Ni—O composition, U.S. Pat. No. 6,040,090 and Japanese Patent Publication Laid-Open No. Hei 8-213015 disclose a technique relating to a Li—Mn—Ni—Co—O composition. In addition, Japanese Patent Publication Laid-Open No. Hei 8-171910 proposes a method for preparing a cathode active material of the formula $LiNi_xMn_{1-x}O_2$ wherein x is between 0.7 and 0.95, comprising mixing an alkaline solution with an aqueous mixed solution containing manganese and nickel, co-precipitating manganese and nickel, mixing the resulting co-precipitated compounds and lithium hydroxide and calcining them. Recently, Japanese Patent Application No. 2000-227858 discloses a new type of the cathode active material by homogeneously dispersing nickel and manganese compounds at an atomic level to prepare a solid solution, unlike the concept of partially replacing $LiNiO_2$ or $LiMnO_2$ with a transition metal.

Further, recently, Japanese Patent Publication Laid-Open Nos. 2003-238165, 2003-203633, 2003-242976A, 2003-197256A, 2003-86182, 2003-68299 and 2003-59490 disclose a process for preparing a high capacity cathode active material having improved charge/discharge reversibility and thermal stability, comprising dissolving nickel and manganese salts, or nickel, manganese and cobalt salts in an aqueous solution, simultaneously adding an alkaline solution to a reactor in order to obtain a metal hydroxide or oxide as a precursor material while purging with a reducing agent or inert gas, mixing the precursor material with lithium hydroxide followed by calcination.

As portable electronic instruments realize high performance, realization of high capacity and large current of a lithium secondary battery is also in great demand. In order to accomplish this purpose, it is necessary to develop the cathode active material which is capable of increasing an amount of the cathode active material by increasing the packing density of the cathode active material or reducing an amount of a conductive material incorporated into a cathode plate while improving electron conductivity and ion conductivity of the cathode active material and exhibiting no changes in the crystal structure due to charge/discharge cycles. In order to achieve this, there has been made a variety of studies. As one method for this purpose, there have been made studies of increasing charge efficiency by forming the cathode active material in the form of a sphere, increasing a contact area between electrode active materials by improving charge efficiency and thus improving conductivity, and increasing the amount of the active materials by reducing an amount of a conductive material in a composite cathode. For example, Japanese Patent Publication Laid-Open Nos. 2003-86182, 2003-68299 and 2003-59490 disclose a process for preparing a lithium composite hydroxide by mixing and calcining nickel hydroxide, cobalt hydroxide, manganese hydroxide and lithium hydroxide in the form of a sphere or oval thereby aggregating primary particles to form secondary particles. However, in this compound, there are many voids between the primary particles and thus the tap density is relatively low when compared to a lithium cobalt oxide, resulting in a decreased amount of the chargeable active material leading to difficulty in realizing a high capacity.

Recently, $LiNi_{1-x}Co_xO_2$ wherein X is equal to or greater than 0.7, which receives a great deal of attention as a high capacity material, exhibits excellent charge/discharge characteristics and high capacity characteristics of more than 180 mAh/g, but is limited in its practical use in a battery due to instability of $Ni^{3+}$ or $Ni^{4+}$ when charging.

As a material having the layered crystal structure capable of substituting $LiCoO_2$, to which a great deal of attention is directed, mention may be made of $Li[Ni_{1/2}Mn_{1/2}]O_2$ and $Li[Ni_{1/3}Co_{1/3}Mn_{1/3}]O$ containing a 1:1 mixture of Ni—Mn and Ni—Co—Mn, respectively. These materials exhibit relatively low costs, high capacity and excellent thermal stability compared to $LiCoO_2$. However, such materials have the relatively low electron conductivity compared to $LiCoO_2$, and thus the high-rate and low temperature characteristics are poor, and it is failed to improve the battery energy density due to a low tap density, in spite of the high capacity. In particular, in the case of $Li[Ni_{1/2}Mn_{1/2}]O_2$, it has a very low electron conductivity, thus making it difficult to realize a practical use (J. of Power Sources, 112(2002) 41-48) Particularly, these materials exhibit inferior high output power characteristics as compared to $LiCoO_2$ or $LiMn_2O_4$, for use in electric vehicles as a hybrid power source.

A general method for preparing $Li[Ni_{1/2}Mn_{1/2}]O_2$ and $Li[Ni_{1/3}Co_{1/3}Mn_{1/3}]O_2$ is performed by simultaneously precipitating two or three elements in an aqueous solution using a neutralization reaction, so as to a precursor in the form of hydroxide or oxide, mixing the precursor thus obtained with lithium hydroxide and then calcining them. Unlike a conventional co-precipitation reaction, the co-precipitated particles containing manganese are usually irregular plate-like and have a tap density that is 50% when compared to that of nickel or cobalt. For example, Japanese Patent Publication Laid-Open 2002-201028 uses a conventional reactor by way of an inert precipitation method, and the resulting precipitated particles have very broad distribution of particle sizes and shapes of the primary particles are different from each other. Further, International Application PCT WO 02/078105A1, filed by Matsushita Electric Industrial Co., Ltd., proposes a gravity-precipitation type of a reactor using gravity of the precipitated materials in order to obtain uniform particles, but suffers from disadvantages such as being costy due to a need for increasing pressure of a circulation pump when scaling-up, and operation difficulty due to complicated process caused by addition of additional equipments. In order to resolve these problems, a method of inducing formation of spherical particles using high-speed rotation has been conventionally employed. However, even though the conventional reactor is a continuous reactor by high speed rotation, application of such method presents disadvantages such as irregular changes in volume of reactant materials, volume expansions due to violent waves and a Ni—Co—Mn composite hydroxide having an irregular plate-like shape of particles, thus lowering the tap density.

DISCLOSURE OF INVENTION

Technical Problem

Therefore, the present invention has been made in view of the above problems, and it is an object of the present invention to provide a high capacity cathode active material having controlled oxidation state of nickel, manganese and cobalt elements and an improved tap density through a substitution of metal elements.

The present invention proposes a reactor design that is applicable to a conventional reactor without significant modification, even when modifying the inner wall thereof and scaling-up.

Further, the present invention proposes a method of synthesis using the reactor as described above, and thereby can provide a high capacity, high stability cathode active material, capable of obtaining a spherical precipitated material with a uniform and dense distribution of particle sizes, and having a high charge efficiency and an enhanced charge density by controlling the numbers, shapes and sizes of primary particles.

It is another object of the present invention to enhance packing density by mixing homologous or heterologous active materials having different mean particle diameter.

Technical Solution

In accordance with the present invention, the above and other objects can be accomplished by the provision of a process for preparing a cathode active material for a lithium secondary battery, having a formula $Li_{1+\delta}[Ni_xMn_{x-y/2}Co_{1-2x-z}M_yN_z]O_{2-a}P_a$ or $Li_{1+\delta}[Ni_xMn_{x+y}Co_{1-2(x+y)}M_y]O_{2-a}P_a$ (M═Mg, Zn, Ca, Sr, Cu, Zr, N═Fe, Al, Ga, In, Cr, Ge, Sn, P═F or S, $-1/10 \leq \delta \leq 1/10$, $0 \leq x \leq 1$, $0 \leq y \leq 1/10$, $0 \leq z \leq 1/10$, $0 \leq a \leq 0.3$), comprising the steps of:

simultaneously adding a metal precursor, an aqueous ammonia solution and a basic solution to a reactor and mixing and precipitating them to obtain a metal composite hydroxide; and mixing and reacting the metal composite hydroxide with a lithium precursor to obtain a lithium-metal composite oxide.

In one embodiment, the present invention provides a process for preparing a cathode active material for a lithium secondary battery, wherein an aqueous solution containing more than two metal salts is used as the metal precursor.

In one embodiment, the present invention provides a process for preparing a cathode active material for a lithium secondary battery wherein the concentration of the aqueous ammonia solution is between 0.2 to 0.3 of the aqueous metal solution.

In one embodiment, the present invention provides a process for preparing a cathode active material for a lithium secondary battery wherein a retention time of the metal precursor in the reactor is between 5 and 10 hours.

In one embodiment, the present invention provides a process for preparing a cathode active material for a lithium secondary battery wherein the basic solution is added to make a pH of 11.0 to 11.5.

In one embodiment, the present invention provides a process for preparing a cathode active material for a lithium secondary battery wherein in the step of obtaining the lithium metal composite oxide, citric acid, stannic acid, glycolic acid or maleic acid is used as a chelating agent.

In accordance with another aspect of the present invention, there is provided a reactor for preparing a cathode active material for a lithium secondary battery, having a structure in which rotary vanes are designed in a reverse vane type, and baffles are spaced apart from the inner wall of the reactor.

In one embodiment, the present invention provides a reactor for preparing a cathode active material for a lithium secondary battery wherein the number of baffles is 3.

In accordance with another aspect of the present invention, there is provided a cathode active material for a lithium secondary battery prepared by the process for the same as described above.

In one embodiment, the present invention provides a cathode active material for a lithium secondary battery wherein a particle diameter of primary particles is between 0.1 and 2 μm, a mean particle diameter of secondary particles is 10 μm, and the active material has a layered rock salt structure.

In one embodiment, the present invention provides a cathode active material for a lithium secondary battery wherein an oxidation value of nickel is 2.0, an oxidation value of manganese is 4.0 and an oxidation value of cobalt is 3.0.

In one embodiment, the present invention provides a cathode active material for a lithium secondary battery, further comprising a lithium composite oxide B having a mean particle diameter smaller than that of the cathode active material.

In one embodiment, the present invention provides a cathode active material for a lithium secondary battery wherein a mean particle diameter of the lithium composite oxide B is less than 90% of that of the cathode active material.

In one embodiment, the present invention provides a cathode active material for a lithium secondary battery wherein the amount of the lithium composite oxide B is between 5 and 40 wt %.

In one embodiment, the present invention provides a cathode active material for a lithium secondary battery wherein the lithium composite oxide B has the same composition as the cathode active material for a lithium secondary battery, or is represented by a general formula of $LiNi_{1-x-y}Co_xM_yO_2P_z$ (M=Al, Mg, Zr, Ti, P=F, S, X≤0.1, 0≤y≤0.1, 0≤z≤0.1)

Figure 8:
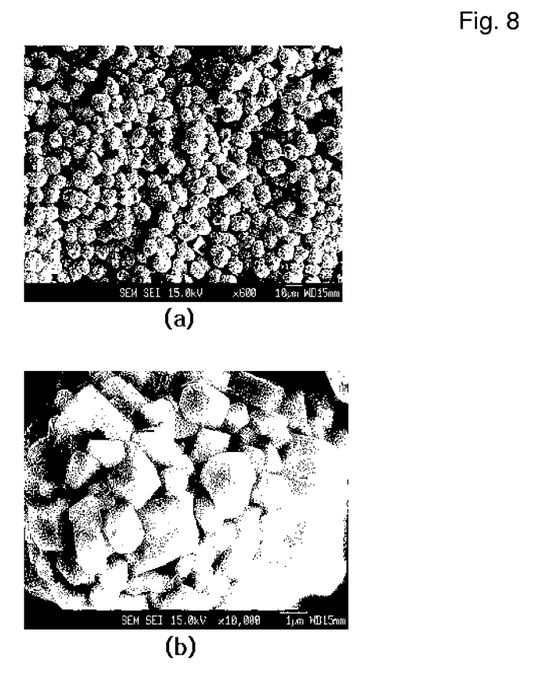
FIGS. 8a and 8b are, respectively, FE-SEMs (X 600) and (X10000), of a cathode active material prepared in Example 11.

The cathode active material in accordance with the present invention is represented by a general formula of $Li_{1+\delta}[Ni_xMn_{x-y/2}Co_{1-2x-z}M_yN_z]O_{2-a}P_a$ or $Li_{1+\delta}[Ni_xMn_{x+y}Co_{1-2(x+y)}M_y]O_{2-a}P_z$(M=Mg, Zn, Ca, Sr, Cu, Zr, N=Fe, Al, Ga, In, Cr, Ge, Sn, P=F, S, −1/10≤δ≤1/10, 0≤x≤1, 0≤y≤1/10, 0≤z≤1/10, 0≤a≤0.3) This material is made of the secondary particles formed by aggregation of the primary particles, which can be confirmed from FIGS. 8a and 8b. At this time, a mean particle diameter of the primary particles is 1 μm, and a mean particle diameter of the secondary particles is 10 μm. Establishing the mean particle diameter of the primary particles to 1 μm contributes to enhanced reactivity of charge/discharge and improved high-rate characteristics of the battery, and establishing a mean particle diameter of the secondary particles to 10 μm contributes to increased chargeability and improved coatability of the lithium composite oxide, thus enabling the battery to realize high capacity.

In the cathode active material in accordance with the present invention, $Li_{1+\delta}[Ni_xMn_{x-y/2}Co_{1-2x-z}M_yN_z]O_{2-a}P_a$ or $Li_{1+\delta}[Ni_xMn_{x+y}Co_{1-2(x+y)}M_y]O_{2-a}P_a$, Ni, Mn, Co, substitute metals M and N have an oxidation number of 2, 4, 3, 2 and 3, respectively. In particular, the material in which an oxidation number of Mn is 4, can prevent a Jahn-Teller effect structural transition caused by an oxidation/reduction reaction between $Mn^{+3}$ and $Mn^{+4}$ in a conventional orthorhombic or layered structure of $LiMnO_2$, thus providing structural stabilization upon charging/discharging.

Figure 1:
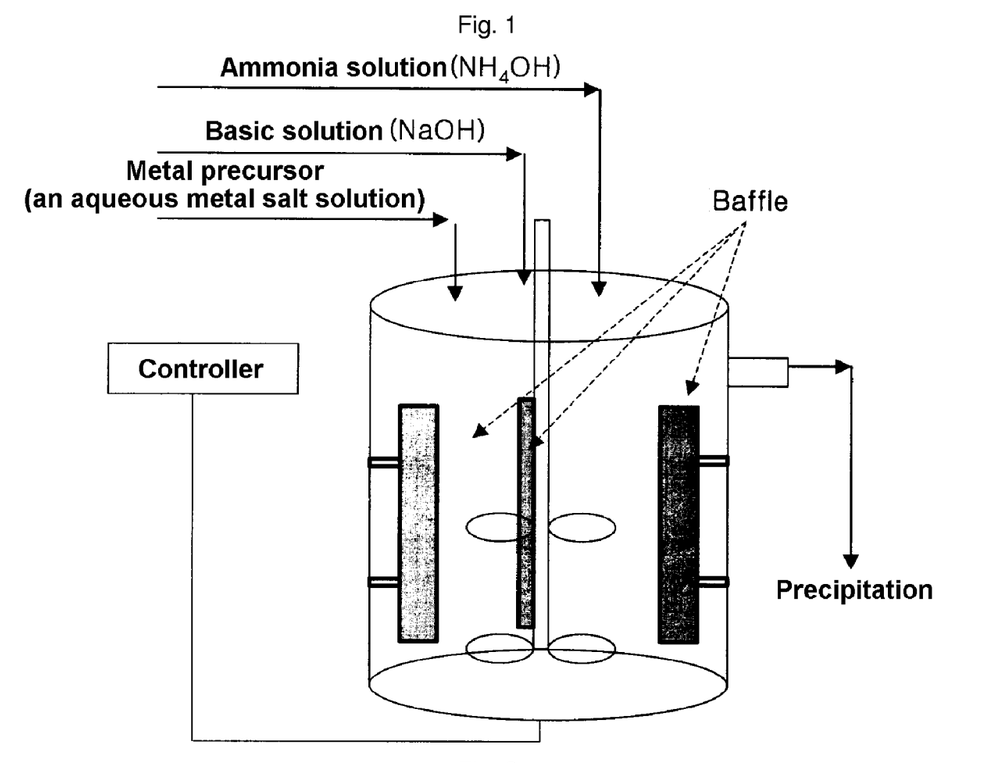
FIG. 1 is a perspective view of a reactor.

In order to prepare the cathode active material in accordance with the present invention, there is used a reactor devised by the present inventor. The reactor has a structure including rotary vanes designed in a reverse vane type and three baffles spaced 2 to 3 cm apart from the inner wall thereof. The design for the reverse vane type is to ensure uniform mixing of upper and lower parts, and spacing the baffles installed on the inner surface of the reactor apart from the inner wall thereof is to control the wave strength and concentration, and enhance turbulent effects so as to solve local ununiformity of a reaction liquor. FIG. 1 is a perspective view of the reactor in accordance with the present invention.

Use of the reactor in accordance with the present invention provided improvement of about 10% in tap density of the hydroxide thus obtained, as compared to when using a conventional reactor. The preferred tap density of the hydroxide in the present invention is 1.95 g/cm³, preferably more than 2.1 g/cm³, and more preferably 2.4 g/cm³

In addition, the process for preparing the cathode active material in the present invention, unlike a conventional ammonia complex method involving first mixing an aqueous ammonia solution with a metal solution followed by precipitation, can provide precipitates having particle uniformity and uniform distribution of metal elements by adding an aqueous solution containing more than two metals, the aqueous ammonia solution and an aqueous NaOH solution to the reactor, respectively, so as to prevent initial oxidation of Mn ions. Further, the reaction solution was subjected to ultrasonification to promote the growth of the primary particles and thereby highly dense nickel, manganese, cobalt hydroxides were obtained. Preferably, the aqueous metal solution has a concentration of 2M to 3M, an aqueous ammonia solution has a concentration of 0.2 to 0.3 of the aqueous metal solution concentration, and the aqueous NaOH solution has a concentration of 4M to 5M. The reason why the concentration of the aqueous ammonia solution is established in a range of 0.2 to 0.3 of the aqueous metal solution concentration is because ammonia reacts with a metal precursor in a ratio of 1:1, but an intermediate product may be recovered again for re-use as ammonia. Also, this condition is an optimum condition for enhancing crystallinity of a cathode active material and stabilizing the active material.

Specifically, first, nickel, manganese, cobalt and substitute metal salts were dissolved in distilled water and then added together with an aqueous ammonia solution and an aqueous NaOH solution to the reactor. A co-precipitation is a method of obtaining a composite hydroxide by simultaneous precipitation of more than two elements using a neutralization reaction in an aqueous solution. After the reactor reached a qualitative state, a composite hydroxide was continuously obtained which is discharged through an overflow pipe installed on the top of the reactor. A mean retention time of the solution was adjusted to 6 hours, a pH was maintained at a range of 11.0 to 11.5 and a temperature of the reactor was maintained at 50 to 55° C. The reason of increasing the reactor temperature is because the resulting cobalt hydroxide is precipitated in the form of a complex salt at low temperatures, and thus it is difficult to obtain a high-density composite hydroxide. The composite hydroxide thus obtained was washed with distilled water and filtered, dried at 110° C. for 15 hours and used, or was heat treated at 450° C. for 5 hours and used as a precursor. The precursor thus obtained was sufficiently mixed with a lithium hydroxide by a dry method, or a precursor was mixed with an aqueous solution containing lithium hydroxide and citric acid as a chelating agent mixed therein and distilled water was removed by a wet method. Then, the precursor containing lithium mixed therein was calcined at 1000° C. for 10 hours to prepare a lithium composite oxide.

One lithium composite oxide may be used alone as the cathode active material, but by mixing with lithium composite oxide having a small mean particle diameter, the chargeability of the cathode active material can be further improved and thereby the electrode capacity can be increased. This is because the small mean particle diameter lithium composite oxide fills the voids of the lithium composite oxide to improve the packing density of the cathode active material. Given the larger mean diameter lithium composite oxide is designated A and the smaller mean diameter lithium composite oxide is designated B, a difference between a mean particle diameter of A and B is preferably more than 10% of the mean particle diameter of A. In other words, the mean particle diameter of lithium composite oxide B is preferably less than 90% of the mean particle diameter of A. If the difference between mean particle diameter of both lithium composite oxides is preferably less than 10% of the mean particle diameter of A, i.e., the difference between the mean particle diameter of A and B is small, the above-mentioned effects diminish, and the results are the same as in the case in which A is used alone. Whereas, the lower limit of the mean particle diameter of B is 1 μm, and if it is less than 1 μm, the characteristics of the active material are deteriorated and the effects of the combinational use is lowered. The mean particle diameter of lithium composite oxide B refers to an average value of particle diameter of the primary particles when the lithium oxide is composed of the primary particles, or an average value of particle diameter of the secondary particles when the primary particles are aggregated to form the secondary particles. Provided that lithium composite oxide B is preferably in form of which the primary particles are aggregated to form secondary particles. A proportion of lithium composite oxide B is preferably 5 to 40% by weight of the cathode active material, and more preferably 10 to 30% by weight. This is because if the proportion of B is less than that value, there is small difference in the effects as compared to when lithium composite oxide A is used alone, while, if the proportion of B is greater than that value, the portion of lithium composite oxide A became less and thus the effects thereof decrease.

When heterologous material differing from lithium composite oxide A is used as lithium composite oxide B, it is possible to increase electron conductivity or capacity. For example, incorporation of $LiCoO_2$ having excellent electron conductivity can improve the high-rate and low temperature characteristics. Alternatively, when $LiNi_{1-x-y}Co_xM_yO_2P_z$ (M=Al, Mg, Zr, Ti, P=F, S, X≤0.1, 0≤y≤0.1, 0≤z≤0.1) having high capacity but lower thermal stability is used as lithium composite oxide B, since lithium composite oxide A having excellent thermal stability compensates for thermal stability of the cathode active material, it is possible to provide a high capacity, highly stable cathode active material.

As examples of electrolytes which can be used in the lithium secondary battery in accordance with the present invention, mention may be made of ester, for example, cyclic carbonates such as ethylene carbonate(EC), propylene carbonate(PC), butylene carbonate(BC) and vinylene carbonate (VC), non-cyclic carbonate such as dimethyl carbonate (DMC), diethyl carbonate(DEC), ethyl methyl carbonate (EMC) and dipropylcarbonate(DPC), aliphatic carbonate such as methyl formate(IMF), methyl acetate(MA), methyl propionate(MP) and ethyl propionate, and cyclic carbonate such as butyrolactone(GBL) As the cyclic carbonate, EC, PC and VC are particularly preferred. Where appropriate, aliphatic carbonate is preferably included in an amount of less than 20%.

As examples of lithium salts which are dissolved in the above-mentioned solvents, mention may be made of $LiClO_4$, $LiBF_4$, $LiPF_6$, $LiAlCl_4$, $LiSbF_6$, $LiSCN$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, LiBOB(Lithium Bis(oxalato)borate), lower aliphatic lithium carbonate, chloro borane lithium, tetraphenyl lithium borate, imides such as $LiN(CF_3SO_2)(C_2F_5SO_2)$, $LiN(CF_3SO_2)_2$, $LiN(C_2F_5SO_2)_2$, and $LiN(CF_3SO_2)(C_4F_9SO_2)$. These salts may be used alone in the electrolyte or may be used in any combination thereof as long as they do not dampen the effects of the present invention. Among them, in particular, $LiPF_6$ is preferably included. In order to render the electrolyte non-combustible, carbon tetrachloride, tri-fluorochloroethylene, or phosphate containing phosphorus may be incorporated in the electrolyte.

In addition, a solid electrolyte may be used. As inorganic solid electrolytes, $Li_4SiO_4$, $Li_4SiO_4$—LiI-LiOH, $xLi_3PO_{4-(1-x)}Li_4SiO_4$, $Li_2SiS_3$, $Li_3PO_4$—$Li_2S$—$SiS_2$, and phosphorus sulfide compound are effective. As organic solid electrolytes, polymeric materials such as polyethylene oxide, polypropylene oxide, polyvinyl alcohol, polyfluorovinylidene, and fluoropropylene, or their derivatives, mixtures and complexes are effective.

As separators, polyethylene based polymers such as porous polyethylene, or polypropylene based polymers are generally used.

As anode materials used in the present invention, preferably, compounds capable of occluding/releasing lithium ions may be used, such as lithium, lithium alloys, alloys, intermetallic compounds, carbon, organic compounds, inorganic compounds, metal complexes and organic polymeric compounds. These compounds may be used alone or may be used in any combination thereof as long as they do not dampen effects of the present invention. As the lithium compounds, mention may be made of Li—Al based alloys, Li—Al—Mn based alloys, Li—Al—Mg based alloys, Li—Al—Sn based alloys, Li—Al—In based alloys, Li—Al—Cd based alloys, Li—Al—Te based alloys, Li—Ga based alloys, Li—Cd based alloys, Li—In based alloys, Li—Pb based alloys, Li—Bi based alloys and Li—Mg based alloys. As alloys or intermetallic compounds, mention may be made of transition metals and silicon compounds, or transition metals and tin compounds and in particular, nickel and silicon compounds are preferred. As carbonaceous materials, mention may be made of coke, pyrolytic carbons, natural graphites, artificial graphite, meso carbon micro beads, graphitized meso phase globules, vapor phase grown carbons, vitreous carbons, carbon fibers (poly acrylonitrile based-, pitch based-, cellulose based-, vapor phase grown carbon based-), amorphous carbons and organic material calcining carbon. These materials may be used alone or may be used in any combination thereof as long as they do not dampen effects of the present invention. In addition, as outer packaging materials, a metal can or a packaging material made of aluminum and several plied polymer layer is largely used.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Examples

Now, the present invention will be described in more detail with reference to the following Examples. These examples are provided only for illustrating the present invention and should not be construed as limiting the scope and sprit of the present invention.

Example 1

To a 4 L reactor shown in FIG. 1 (output power of a rotary motor: more than 80 W) was charged 4 L of distilled water and then a sodium hydroxide solution was added to adjust the pH to 11.0 and nitrogen gas was bubbled in the reactor at a rate of 1 L/min so as to remove dissolved oxygen. The reactants were stirred at 1000 rpm while maintaining the temperature of the reactor at 50° C. A 3M aqueous metal solution, in which nickel sulfate, manganese sulfate and cobalt sulfate were mixed in a mol ratio of 1:1:1, was added at a rate of 0.5 L/hr to the reactor, followed by continuous addition of a 0.9M ammonia solution at a rate of 0.35 L/hr. A 5M sodium hydroxide solution, which serves to adjust the pH, was automatically added according to the predetermined pH. At this time, the pH was adjusted to 11.0. A mean retention time of the solution was brought to about 6 hours by controlling flow rate thereof. After the reaction reached qualitative state, a nickel-manganese-cobalt composite hydroxide in the spherical form was continuously obtained through an overflow pipe. The hydroxide thus obtained was dried at 110° C. for 15 hours followed by spontaneous oxidation.

Thereafter, 95 g of the nickel-manganese-cobalt composite hydroxide was mixed in a solution containing 43.2 g of lithium hydroxide and 4.75 g of citric acid dissolved in distilled water, and then was purged with $N_2$ to remove distilled water while being maintained at 80° C. The resulting mixture was heated at elevation rate of 2° C./min and maintained at 450 to 500° C. for 5 hours to perform pre-calcination, followed by calcination at 1000° C. for 10 hours. Next, annealing was carried out at 700° C. for 10 hours to obtain cathode active material powder $Li[Ni_{1/3}Mn_{1/3}Co_{1/3}]O_2$.

Figure 2:
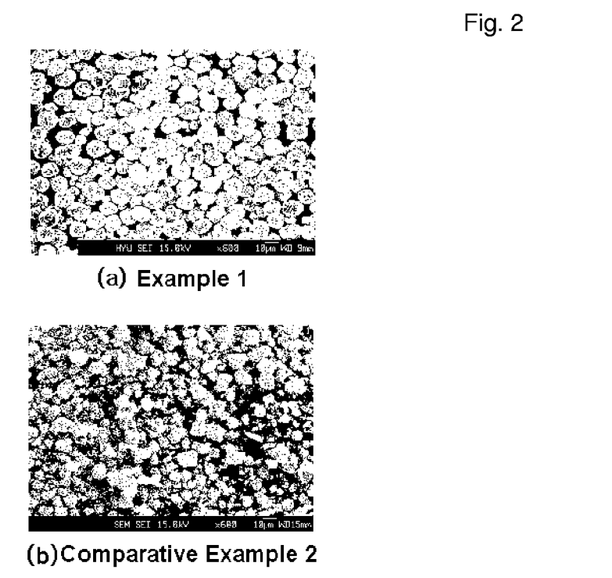
FIGS. 2a and 2b are, respectively, FE-SEMs (X 600) of cathode active materials prepared in Example 1 and Comparative Example 1.

FIG. 2a is an FE-SEM of cathode active material powder. The cathode active material powder obtained had a mean particle diameter of 1 μm of the primary particles, a mean particle diameter of 10 μm of the secondary particles and BET specific surface area of 0.5 m$^2$/g, and very uniform particle size distribution. In addition, the tap density of the powder was between 2.0 and 2.3 g/cm$^3$. Comparing FIG. 2a with a photograph of Comparative Example 1 in FIG. 2b, it can be seen that the cathode active material of Example 1 was spherical.

The prepared cathode active material, acetylene black as a conductive material, and polyvinylidene fluoride(PVdF) as a binding agent, in a weight ratio of 80:10:10, were mixed to prepare a slurry. The slurry thus obtained was uniformly applied to a sheet of aluminum foil having a thickness of 20 μm and dried under vacuum at a temperature of 120° C. to prepare a cathode. A coin type of a half battery was prepared using the prepared cathode, a lithium foil as a counter electrode and a porous polyethylene film (Cellgard 2300, thickness: 25 μm, CellGard LLC.) as a separator, and a liquid electrolyte in which 1M $LiPF_6$ was dissolved in a mixed solvent containing ethylene carbonate and diethyl carbonate in a volume ratio of 1:1, by means of a conventionally known preparation process. The coin battery thus prepared was evaluated on the battery characteristics at a range of 2.8 to 4.3V, using an electrochemical analyzer (Toscat 3100U, Toyo System Co., Ltd.)

Example 2

Figure 3:
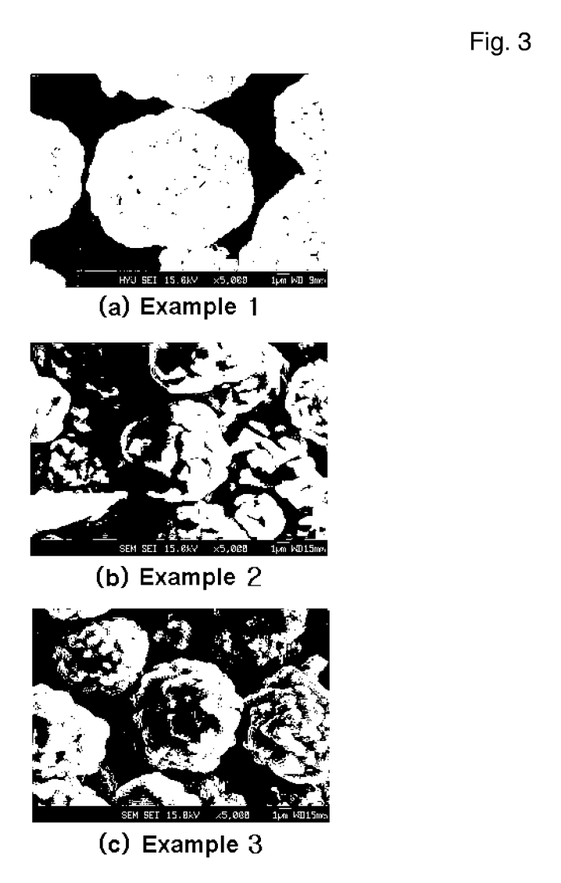
FIGS. 3a through 3c are, respectively, FE-SEMs (X 5000) of cathode active materials prepared in Examples 1 through 3.

Cathode active material powder $Li[Ni_{1/3}Mn_{1/3-0.002}Co_{1/3}Mg_{0.04}]O_2$ was synthesized by performing the same procedure as in Example 1 except that an aqueous metal solution in which nickel sulfate, manganese sulfate, cobalt sulfate and magnesium sulfate were mixed in a mol ratio of 1:0.98:1:0.04 was used instead of a 3M aqueous metal solution in which nickel sulfate, manganese sulfate and cobalt sulfate were mixed in a mol ratio of 1:1:1, and then a coin-type half battery was prepared using the cathode active material thus obtained. FIG. 3b is an FE-SEM of cathode active material powder thus obtained.

Example 3

Cathode active material powder $Li[Ni_{1/3}Mn_{1/3}Co_{1/3-0.04}B_{0.04}]O_2$ was synthesized by performing the same procedure as in Example 1 except that an aqueous metal solution in which nickel sulfate, manganese sulfate, cobalt sulfate and boric acid were mixed in a mol ratio of 1:1:0.96:0.04 was used instead of a 3M aqueous metal solution containing nickel sulfate, manganese sulfate and cobalt sulfate were mixed in a mol ratio of 1:1:1, and then a coin-type half battery was prepared using the cathode active material thus obtained. FIG. 3c is an FE-SEM of cathode active material powder thus obtained.

Example 4

Cathode active material powder $Li[Ni_{1/2}Mn_{1/2}]O_2$ was synthesized by performing the same procedure as in Example 1 except that an aqueous metal solution in which nickel sulfate and manganese sulfate were mixed in a mol ratio of 1:1 was used instead of a 3M aqueous metal solution in which nickel sulfate, manganese sulfate and cobalt sulfate were mixed in a mol ratio of 1:1:1, and then a coin-type half battery was prepared using the cathode active material thus obtained.

Example 5

Cathode active material powder $Li[Ni_{2/5}Mn_{2/5}Co_{1/5}]O_2$ was synthesized by performing the same procedure as in Example 1 except that an aqueous metal solution in which nickel sulfate, manganese sulfate, and cobalt sulfate were mixed in a mol ratio of 2:2:1 was used instead of a 3M aqueous metal solution in which nickel sulfate, manganese sulfate and cobalt sulfate were mixed in a mol ratio of 1:1:1, and then a coin-type half battery was prepared using the cathode active material thus obtained.

Comparative Example 1

Cathode active material powder $Li[Ni_{1/3}Mn_{1/3}Co_{1/3}]O_2$ was synthesized by performing the same procedure as in Example 1 except that a reactor in which one baffle was attached to the inner wall of the reactor was used, and then a coin-type half battery was prepared using the cathode active material thus obtained.

Characteristic values of the cathode active material powder prepared in Examples 1 through 5 and Comparative Example 1 are shown in Table 1 below.

TABLE 1

| | | Particle diameter distribution (μm) | | Tap density (g/cm³) | 5th discharge capacity (mAh/g) |
|---|---|---|---|---|---|
| | Composition formula | Primary particles | Secondary particles | | |
| Ex. 1 | $Li[Ni_{1/3}Mn_{1/3}Co_{1/3}]O_2$ | 1-2 | 10 | 2.1 | 159 |
| Ex. 2 | $Li[Ni_{1/3}Mn_{1/3-0.02}Co_{1/3}Mg_{0.04}]O_2$ | 1-2 | 10 | 2.7 | 153 |
| Ex. 3 | $Li[Ni_{1/3}Mn_{1/3}Co_{1/3-0.04}B_{0.04}]O_2$ | 2-3 | 10 | 2.2 | 157 |
| Ex. 4 | $Li[Ni_{1/2}Mn_{1/2}]O_2$ | 0.1-0.2 | 1-20 | 2.2 | 149 |
| Ex. 5 | $Li[Ni_{2/5}Mn_{2/5}Co_{1/5}]O_2$ | 0.5-1 | 10 | 2.3 | 156 |
| Comp. Ex. 1 | $Li[Ni_{1/3}Mn_{1/3}Co_{1/3}]O_2$ | 1-2 | 1-15 | 2.0 | 160 |

Figure 4:
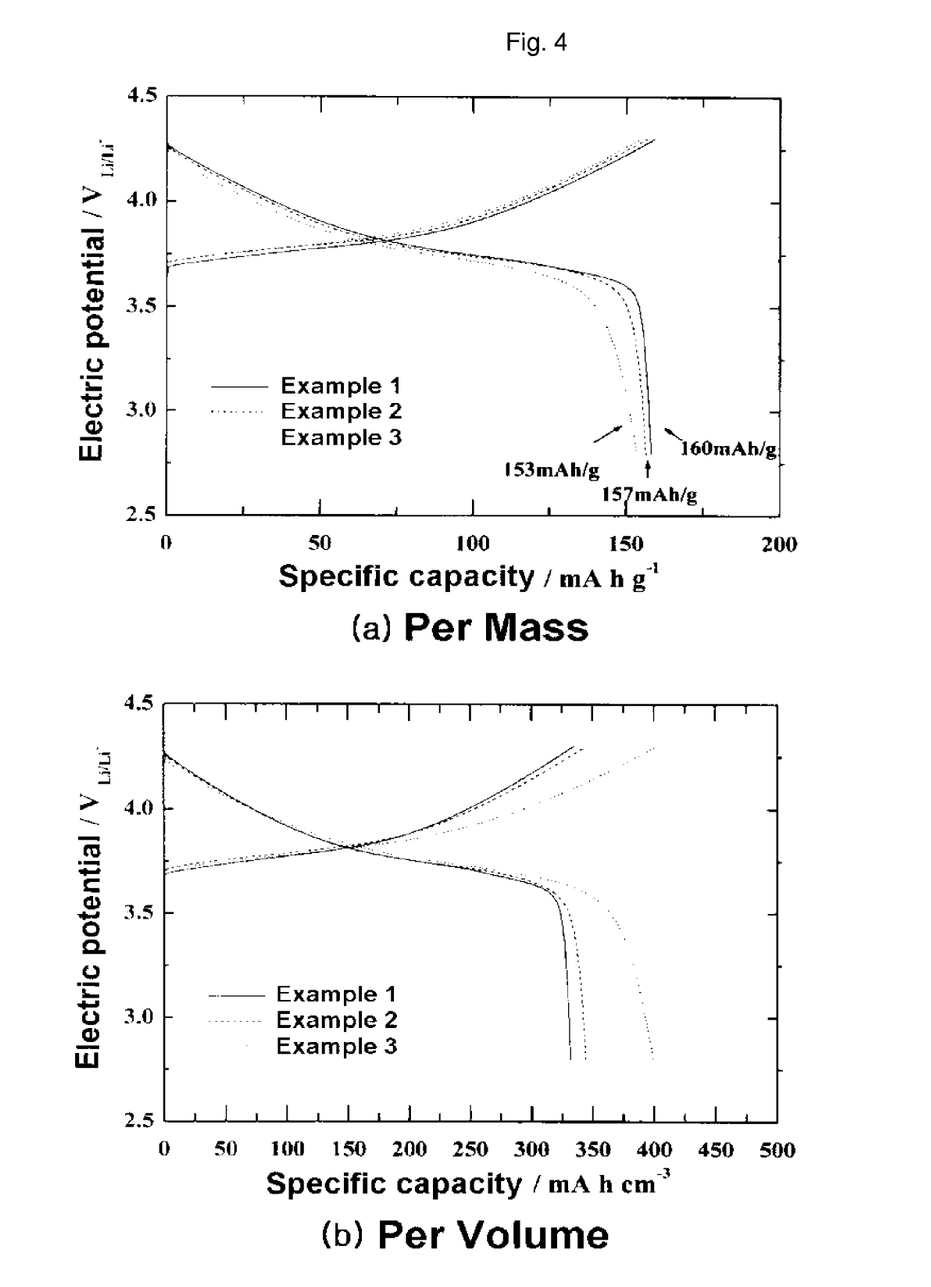
FIGS. 4a and 4b are, respectively, are charge/discharge curve per mass and charge/discharge curve per volume, of cathode active materials prepared in Examples 1 through 3.
Figure 5:
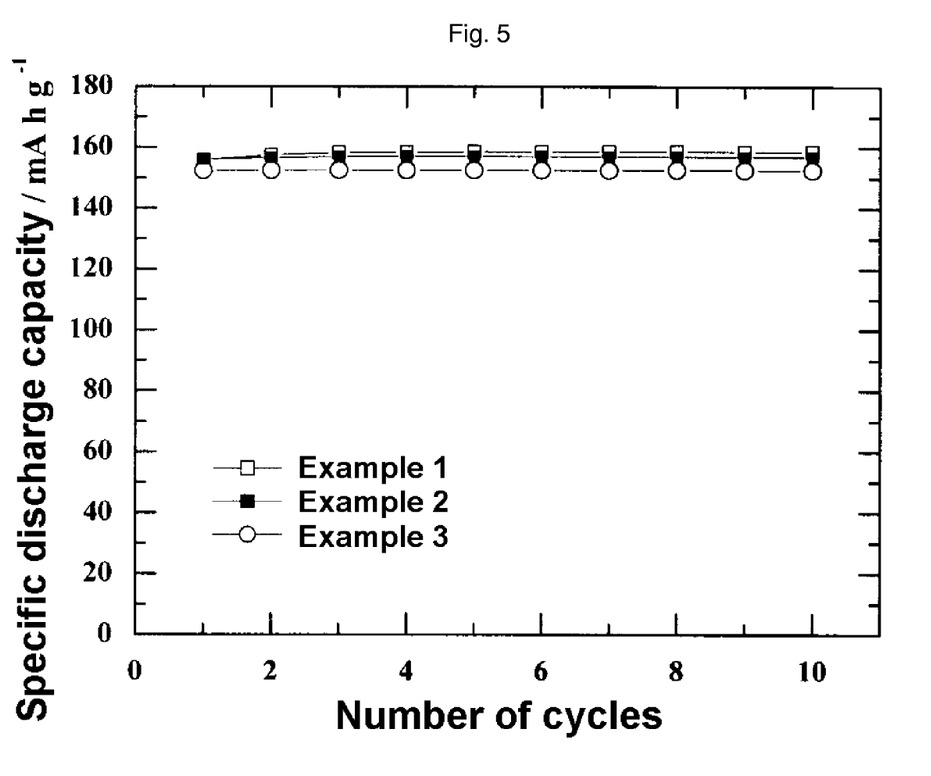
FIG. 5 is a curve showing discharge capacity with respect to charge/discharge cycles of cathode active materials prepared in Examples 1 through 3.
Figure 6:
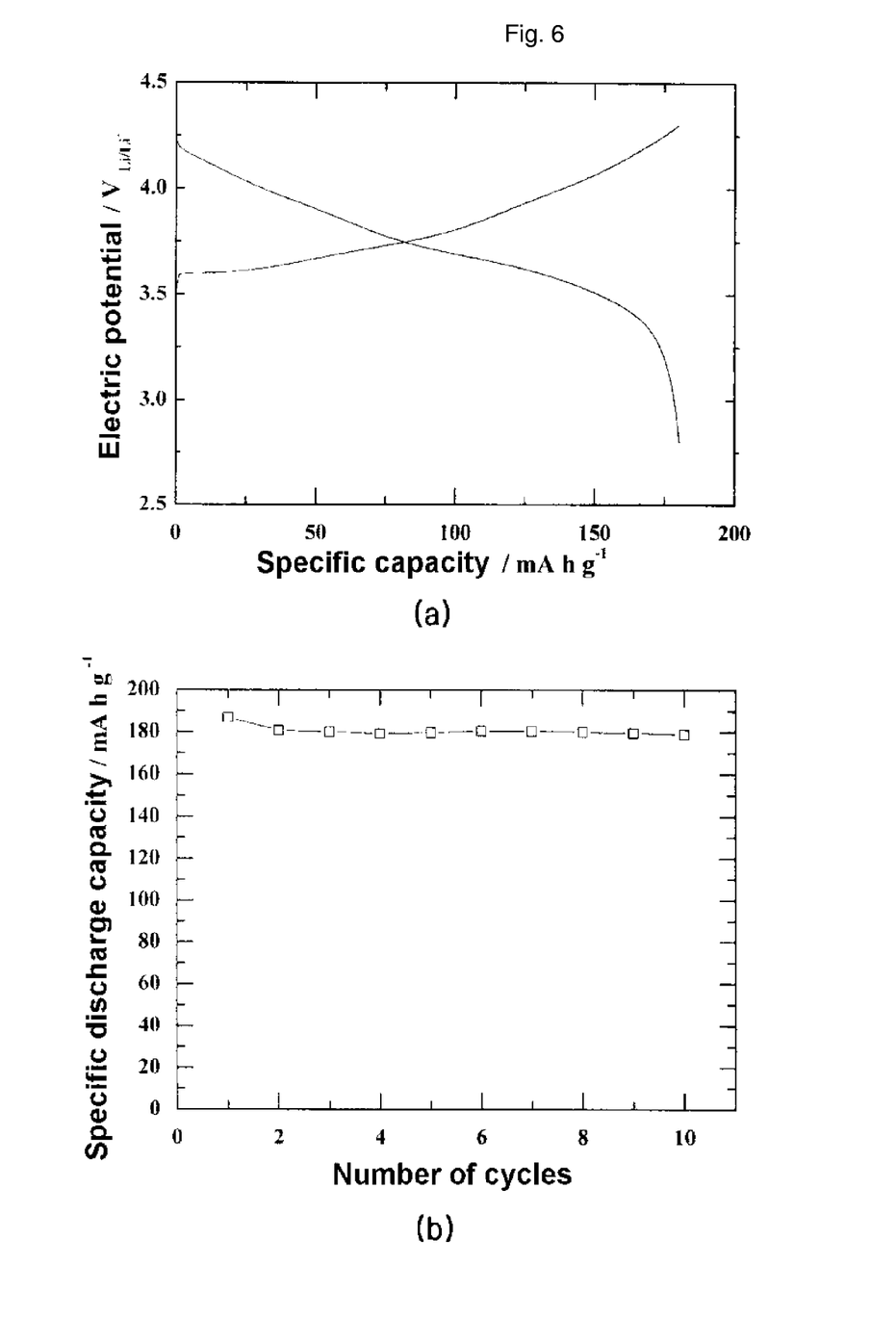
FIGS. 6a and 6b are, respectively, curves showing charge/discharge, and discharge capacity with respect to charge/discharge cycles, of a cathode active material prepared in Example 9.
Figure 7:
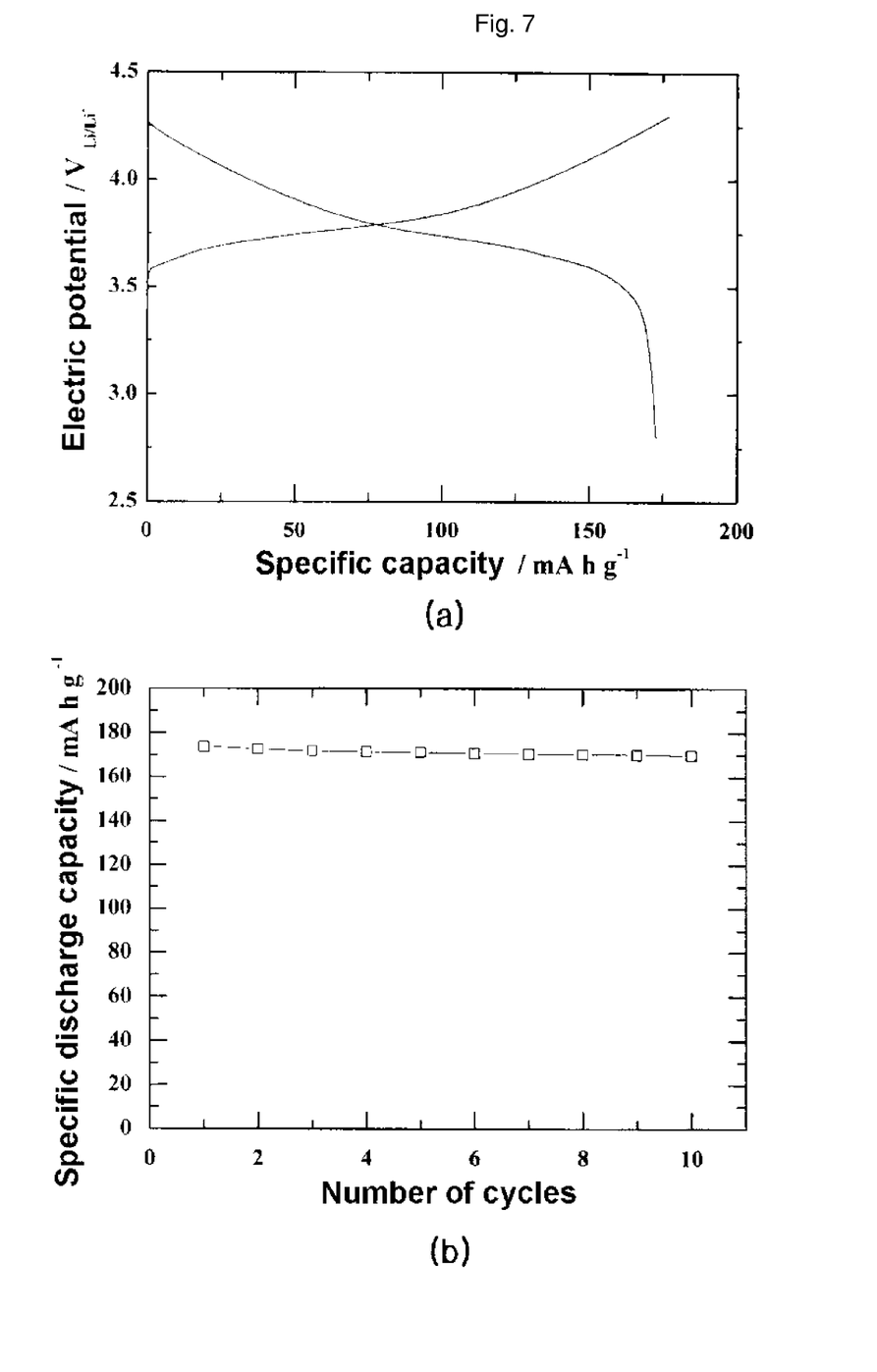
FIGS. 7a and 7b are, respectively, curves showing charge/discharge, and discharge capacity with respect to charge/discharge cycles, of a cathode active material prepared in Example 10.

As can be seen from Table 1, when using the inventive rector, the tap density was improved and the particle size of the secondary particles was uniform. In particular, improvement of the tap density was significant in Example 2. Improved tap density contributes to the improved discharge capacity per unit volume and it is confirmed from a graph showing specific discharge capacity per volume in FIG. 4b. That is, it can be seen that a tap density Example 2 exhibits a greatly improved discharge capacity as compared to Examples 1 and 3.

Example 6

Cathode active material powder $Li[Ni_{1/3}Mn_{1/3}Co_{1/3}]O_2$ was synthesized by performing the same procedure as in Example 1 except that lithium hydroxide and nickel/manganese/cobalt composite hydroxide were quantized and sufficiently mixed such that a mol ratio of Li/(Ni+Mn+Co)=1.02, and then a coin-type half battery was prepared using the cathode active material thus obtained.

Example 7

Cathode active material powder $Li[Ni_{1/3}Mn_{1/3}Co_{1/3}]O_2$ was synthesized by performing the same procedure as in Example 1 except that a pH of the reactor was adjusted to 11.2 from 11.0, and then a coin-type half battery was prepared using the cathode active material thus obtained.

Example 8

By performing the same procedure as in Example 1, a coin-type half battery was prepared using a mixture of A and B in a ratio of 8:2 as a cathode active material, given the powder obtained in Examples 1 and 7 was designated A and B, respectively.

Example 9

A nickel/cobalt hydroxide was obtained by performing the same procedure as in Example 1 except that an aqueous metal solution in which nickel sulfate and cobalt sulfate were mixed in a mol ratio of 4:1 was used instead of a 3M aqueous metal solution in which nickel sulfate, manganese sulfate and cobalt sulfate were mixed in a mol ratio of 1:1:1. Then, the nickel/cobalt composite hydroxide, which was obtained by drying at 110° C. for 15 hours, was sufficiently mixed with lithium hydroxide that was quantized such that a mol ratio of Li/(Ni+Co) was 1.02. The resulting mixture was heated at an elevation rate of 2° C./min, maintained at 450 to 600° C. for 5 hours to perform predomination followed by calcination at 1000° C. for 10 hours and annealing up to 700° C. for 10 hours, and then cooled at a rate of 2° C./min to obtain a cathode active material $Li[Ni_{4/5}Co_{1/5}]O_2$. A coin-type half battery was prepared in the same manner as in Example 1.

Example 10

In accordance with the same manner as in Example 1, a coin-type half battery was prepared using a mixture of A and B in a ratio of 8:2 as a cathode active material, given the powder obtained in Examples 1 and 9 was designated A and B, respectively.

Example 11

A nickel/manganese/cobalt composite hydroxide was synthesized as in Example 1 and sufficiently mixed with LiF and $LiOH.H_2O$ such that a mol ratio of Li/(Ni+Co+Mn)=1.02. The resulting mixture was heated at an elevation rate of 2° C./min, maintained at 450 to 600° C. for 5 hours to perform pre-calcination followed by calcination at 1000° C. for 10 hours and annealing up to 700° C. for 10 hours, and then cooled at a rate of 2° C./min to prepare cathode active material powder $Li[Ni_{1/3}Mn_{0.2933}Co_{1/3}Mg_{0.04}]O_{1.92}F_{0.008}$.

Characteristic values of the cathode active material powder prepared in Examples 7 through 11 and Comparative Example 1 are shown in Table 2 below.

TABLE 2

| | Compositional formula of B | Mean particle diameter of B (μm) | Wt % | | Tap density (g/cm³) | 5th discharge capacity (mAh/g) |
|---|---|---|---|---|---|---|
| | | | A | B | | |
| Ex. 7 | $Li[Ni_{1/3}Mn_{1/3}Co_{1/3}]O_2$ | 5-8 | — | 100 | 2.0 | 160 |
| Ex. 8 | $Li[Ni_{1/3}Mn_{1/3}Co_{1/3}]O_2$ | 5-8 | 80 | 20 | 2.1 | 159 |
| Ex. 9 | $Li[Ni_{4/5}Co_{1/5}]O_2$ | 5-10 | — | 100 | 2.4 | 180 |

TABLE 2-continued

| | Compositional formula of B | Mean particle diameter of B (μm) | Wt % A | Wt % B | Tap density (g/cm³) | 5th discharge capacity (mAh/g) |
|---|---|---|---|---|---|---|
| Ex. 10 | Li[Ni$_{4/5}$Co$_{1/5}$]O$_2$ | 5-10 | 80 | 20 | 2.2 | 172 |
| Ex. 11 | Li[Ni$_{1/3}$Mn$_{0.2933}$Co$_{1/3}$Mg0.04]O1.92F0.08. | 10 | | 100 | 2.6 | 157 |
| Comp. Ex. 1 | Li[Ni$_{1/3}$Mn$_{1/3}$Co$_{1/3}$]O$_2$ | 1-10 | 100 | — | 2.1 | 160 |

Comparing Examples 1 and 8, there was no significant difference in the tap density and the discharge capacity. However, when comparing Example 1 [(Li[Ni$_{1/3}$Mn$_{1/3}$Co$_{1/3}$]O$_2$ alone) and Example 10 [(Li[Ni$_{1/3}$Mn$_{1/3}$Co$_{1/3}$]O$_2$+ Li[Ni$_{4/5}$Co$_{1/5}$]O$_2$)], it can be seen that in Example 10, the tap density increased and in particular, the discharge capacity increased from 159 mAh/g (Example 1) to 172 mAh/g (Example 10) after 5 cycles. Therefore, it was confirmed that when a high capacity material, Li[Ni$_{4/5}$Co$_{1/5}$]O$_2$ is used, the capacity of the cathode active material increases.

Figure 9:
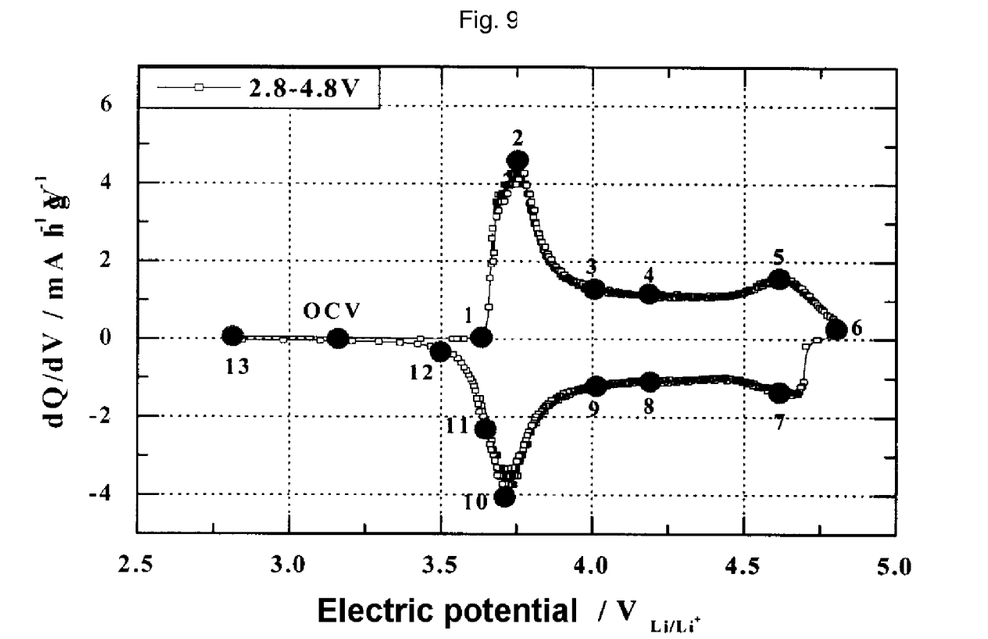
FIG. 9 is a dQ/dV curve of a cathode active material prepared in Example 1.
Figure 10:
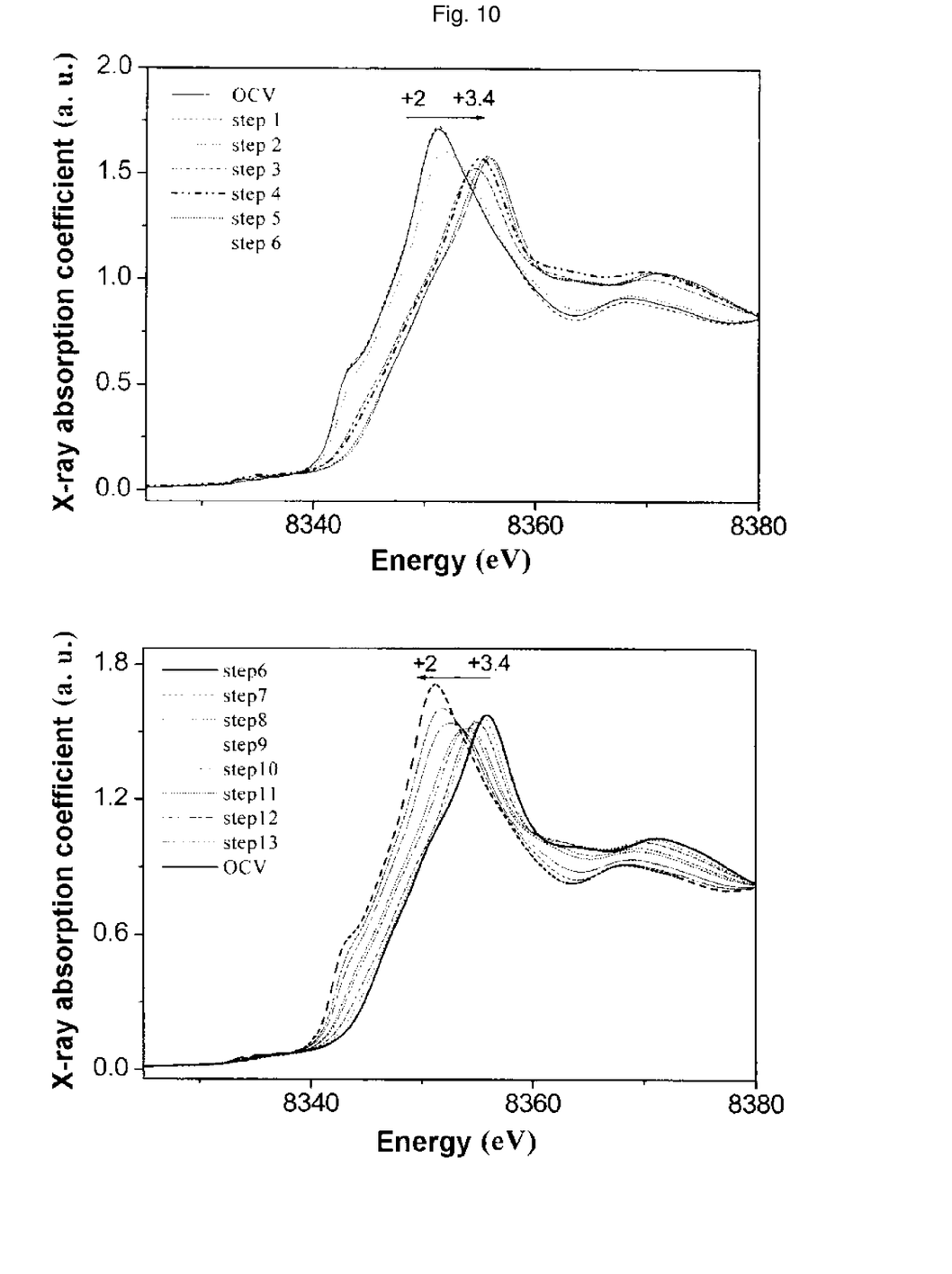
FIG. 10 is a Ni K-edge edge XANES spectra.
Figure 11:
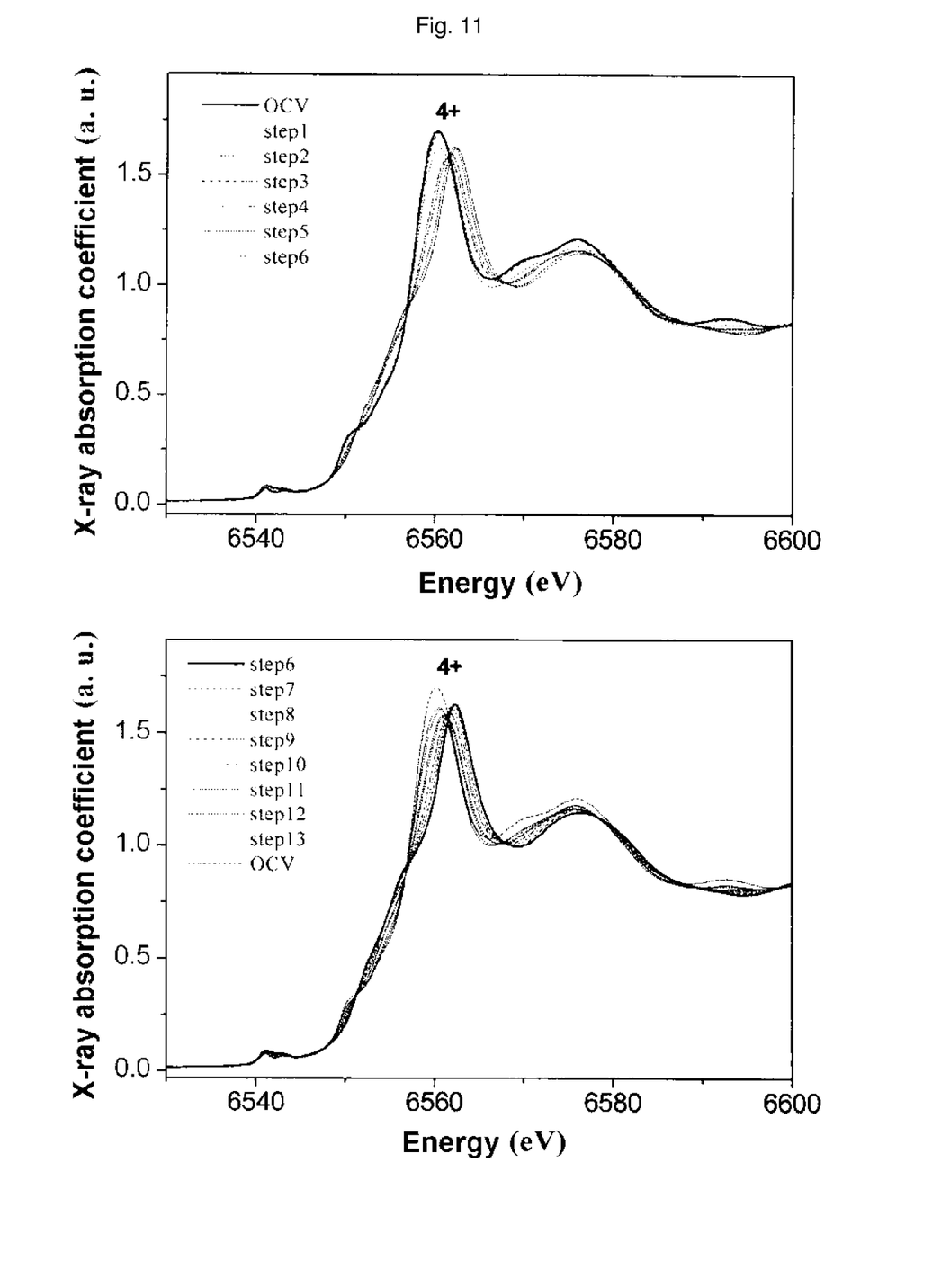
FIG. 11 is a Mn K-edge edge XANES spectra.
Figure 12:
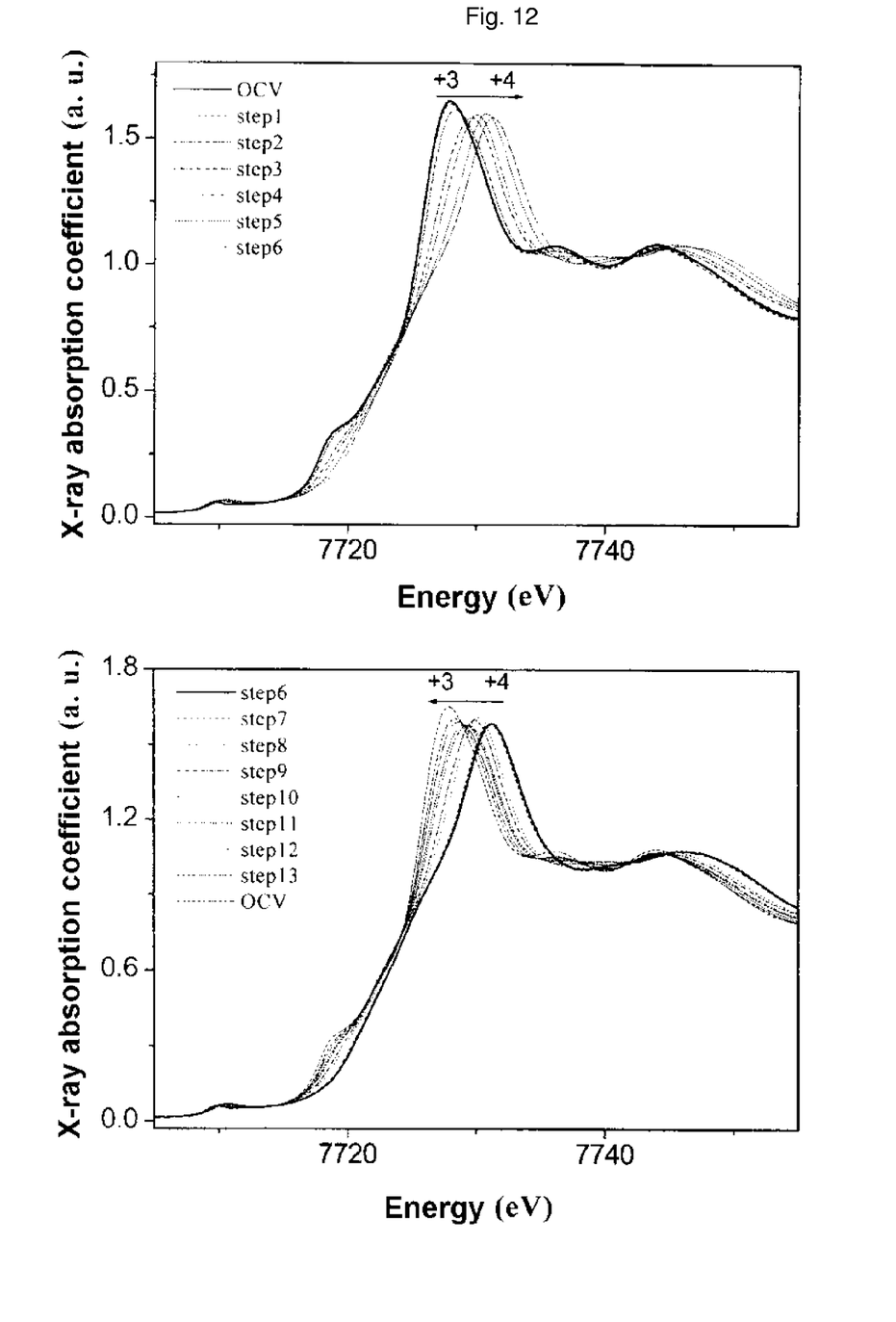
FIG. 12 is a Co K-edge edge XANES spectra.

FIGS. 10 through 12 show the analytical results of XANES (X-ray absorption near edge structure) at points indicated in a dQ/dV curve (FIG. 9) in accordance with charge/discharge of the cathode active material prepared in Example 1. Changes in oxidation number of Ni, Co and Mn on K-edge were roughly equal. It was confirmed that in the case of K-edge of Ni, the oxidation number of Ni shifted from 2$^+$ to 4$^+$ during charge/discharge, in the case of K-edge of Co, the oxidation number of a portion of Co shifted from 3$^+$ to 4$^+$ at more than 4.5V, and in the case of K-edge of Mn, the oxidation number of Mn was fixed at 4$^+$. These facts show that the cathode active material of the present invention can resolve a problem associated with a structural transition occurring in the form of conversion due to an oxidation/reduction reaction of Mn (shifting from 3$^+$ to 4$^+$). This phenomenon was common in cathode active materials prepared in Example 1 as well as Examples 2 through 11.

Industrial Applicability

A cathode active material for a lithium secondary battery in accordance with the present invention exhibits excellent service life, high-rate and thermal stability, and has high capacity or high energy density.

The invention claimed is:

1. A method for preparing a composite cathode active material for a lithium secondary battery, the method comprising:

producing a first lithium metal composite oxide by (a) precipitating a first metal composite hydroxide from a first mixture of a first metal precursor, a first aqueous ammonia solution and a first basic solution, and (b) mixing and reacting the first metal composite hydroxide with a first lithium precursor to form the first lithium metal composite oxide;

producing a second lithium metal composite oxide by (a) precipitating a second metal composite hydroxide from a second mixture of a second metal precursor, a second aqueous ammonia solution and a second basic solution, and (b) mixing and reacting the second metal composite hydroxide with a second lithium precursor to form the second lithium metal composite oxide; and mixing the first and second lithium metal composite oxides in a ratio of 20:80 parts by weight, respectively, to form a composite cathode active material for a lithium secondary battery;

wherein the first lithium metal composite oxide has a mean particle diameter that is greater than 60% but less than 90% of a mean particle diameter of the second lithium metal composite oxide;

the first and second lithium metal composite oxides comprise a primary particle having a particle diameter distribution between about 0.1 μm and about 0.2 μm, and a secondary particle having a mean particle diameter distribution between about 10 μm and about 20 μm when the primary particles are aggregated to form the secondary particles; and the first lithium metal composite oxide has a formula

$LiNi_{1-x'-y}Co_xM'_yO_2P_z;$ the second lithium metal composite oxide has a formula selected from the group consisting of $Li_{1+\delta}[Ni_xMn_{x-y/2}Co_{1-2x-z}M_yN_z]O_{2-a}P_a$ and $Li_{1+\delta}[Ni_xMn_{x+y}Co_{1-2(x+y)}M_y]O_{2-a}P_a;$ M is selected from the group consisting of Mg, Zn, Ca, Sr, Cu and Zr;
M' is selected from the group consisting of Al, Mg, Zr and Ti;
N is selected from the group consisting of Fe, Al, Ga, In, Cr, Ge and Sn;
P is selected from the group consisting of F and S;
δ has a value such that -1/10≤δ≤1/10;
x has a value such that 0.2≤x≤0.4;
x' has a value such that 0.1≤x'≤0.3;
y has a value such that 0≤y≤1/10;
z has a value such that 0≤z≤1/10; and
a has a value such that 0≤a≤0.3.

2. The method of claim 1, wherein
the reactor includes an agitator having a first set of rotary vanes designed to induce fluid flow in a first direction and a second set of rotary vanes designed to induce fluid flow in a second direction that is reverse from the first direction; and
the reactor further includes a plurality of baffles that are spaced 2 to 3 cm apart from an inner wall of the reactor, have a shape of a flat panel and are attached to the inner wall by a plurality of connecting rods.

* * * * *